US012789828B2

(12) United States Patent
Mori

(10) Patent No.: US 12,789,828 B2
(45) Date of Patent: Nov. 10, 2026

(54) ERRONEOUS OPERATION PREVENTION DEVICE

(71) Applicant: TOYOTA JIDOSHA KABUSHIKI KAISHA, Toyota (JP)

(72) Inventor: Masashi Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 19/052,862

(22) Filed: Feb. 13, 2025

(65) Prior Publication Data

US 2025/0282370 A1 Sep. 11, 2025

(30) Foreign Application Priority Data

Mar. 7, 2024 (JP) ................................ 2024-034872

(51) Int. Cl.
*B60W 50/12* (2012.01)
*B60W 10/18* (2012.01)
*B60W 50/14* (2020.01)

(52) U.S. Cl.
CPC .......... *B60W 50/12* (2013.01); *B60W 10/182* (2013.01); *B60W 50/14* (2013.01); *B60W 2050/146* (2013.01); *B60W 2420/403* (2013.01)

(58) Field of Classification Search
CPC .... B60W 50/12; B60W 10/182; B60W 50/14; B60W 2050/146; B60W 2420/403; B60W 50/0098; B60W 50/035; B60W 2540/16; B60T 17/18; B60T 7/107
See application file for complete search history.

(56) References Cited

U.S. PATENT DOCUMENTS

2004/0226808 A1* 11/2004 Claussen ................. B60T 7/107 200/43.17
2005/0085984 A1* 4/2005 Uhler .................... B60W 10/18 701/93
2008/0035444 A1* 2/2008 Schiele ............... F16H 61/0059 192/219.5
2021/0179083 A1* 6/2021 Hara .................. B62D 15/0285
2024/0001922 A1* 1/2024 Ito ................... B60W 30/18009
2024/0083436 A1* 3/2024 Gabor .............. B60W 30/18118

FOREIGN PATENT DOCUMENTS

JP 2006-160203 A 6/2006
JP 2019-069696 A 5/2019
WO WO-0029268 A1 * 5/2000 .............. B60T 7/107
WO WO-2017144355 A1 * 8/2017 .......... B60W 10/182
WO WO-2017188164 A1 * 11/2017 .......... B60W 10/184
WO WO-2019202913 A1 * 10/2019 .............. B60T 7/107

* cited by examiner

*Primary Examiner* — Joseph J Dallo
(74) *Attorney, Agent, or Firm* — Oblon, McClelland, Maier & Neustadt, L.L.P.

(57) ABSTRACT

An erroneous operation prevention device is provided, which includes an acquisition section that acquires information regarding operation of a shift operation section that is operated in order to actuate a shift device of a vehicle, and operation of a parking brake operation section that is operated in order to actuate a parking brake device of the vehicle, and a device control section that prevents actuation of the parking brake device in a case in which operation of the shift operation section and operation of the parking brake operation section have been carried out within a time period that is considered to be simultaneous.

4 Claims, 4 Drawing Sheets

ERRONEOUS OPERATION PREVENTION DEVICE

CROSS-REFERENCE TO RELATED APPLICATION

This application is based on and claims priority under 35 USC 119 from Japanese Patent Application No. 2024-034872 filed on Mar. 7, 2024, the disclosure of which is incorporated by reference herein.

BACKGROUND

Technical Field

The present disclosure relates to an erroneous operation prevention device.

Background Art

Electric parking brake systems that include a parking brake mechanism that applies braking force to a vehicle wheel by actuation of an actuator, an operation switch for switching the parking brake mechanism between a braking state and a braking release state, and a control means that controls braking actuation of the parking brake mechanism by the actuator according to operation of the operation switch, are known.

In an electric parking brake system, for example, when an operation switch is disposed near a shift device, and a shift lever of the shift device is operated in a state in which a foreign object is caught between the shift lever and the operation switch, there is a possibility that the foreign object will long-press the operation switch and that a parking brake device will be unintentionally actuated, even during traveling. Japanese Patent Application Laid-Open (JP-A) No. 2019-69696 discloses technology for preventing unintentional actuation of a parking brake device.

SUMMARY

However, there is still room for improvement from a perspective of preventing unintentional actuation of a parking brake device when a shift lever is operated.

The present disclosure has been made in consideration of the above circumstances, and an object of the present disclosure is to provide an erroneous operation prevention device that prevents unintentional actuation of a parking brake device when a shift lever is operated during traveling of a vehicle.

An erroneous operation prevention device according to a first aspect of the present disclosure includes a memory and a processor coupled to the memory, and the processor includes an acquisition section that acquires information regarding operation of a shift operation section that is operated in order to actuate a shift device of a vehicle, and operation of a parking brake operation section that is operated in order to actuate a parking brake device of the vehicle, and a device control section that prevents actuation of the parking brake device in a case in which operation of the shift operation section and operation of the parking brake operation section have been carried out within a time period that is considered to be simultaneous.

An erroneous operation prevention device according to a second aspect of the present disclosure is the erroneous operation prevention device according to the first aspect, wherein the processor determines whether or not operation of the shift operation section and operation of the parking brake operation section have been carried out within a time period that is considered to be simultaneous, using a signal generated based on operation of the shift operation section and the parking brake operation section.

An erroneous operation prevention device according to a third aspect of the present disclosure is the erroneous operation prevention device according to the first aspect, wherein the processor determines whether or not operation of the shift operation section and operation of the parking brake operation section have been carried out within a time period that is considered to be simultaneous, using a result of detection by a sensor that is provided at an interior of the vehicle and that remotely detects operation of the shift operation section and the parking brake operation section.

An erroneous operation prevention device according to a fourth aspect of the present disclosure is the erroneous operation prevention device according to the third aspect, wherein the sensor is a camera or an infrared sensor.

An erroneous operation prevention device according to a fifth aspect of the present disclosure is the erroneous operation prevention device according to the first aspect, wherein the processor causes a predetermined message to be displayed at a display section of the vehicle in a case in which operation of the shift operation section and operation of the parking brake operation section have been carried out within a time period that is considered to be simultaneous.

According to the present disclosure, an erroneous operation prevention device that prevents unintentional actuation of a parking brake device when a shift lever is operated during traveling of a vehicle can be provided.

BRIEF DESCRIPTION OF THE DRAWINGS

Exemplary embodiments of the present disclosure will be described in detail based on the following figures, wherein.

DETAILED DESCRIPTION

Figure 1:
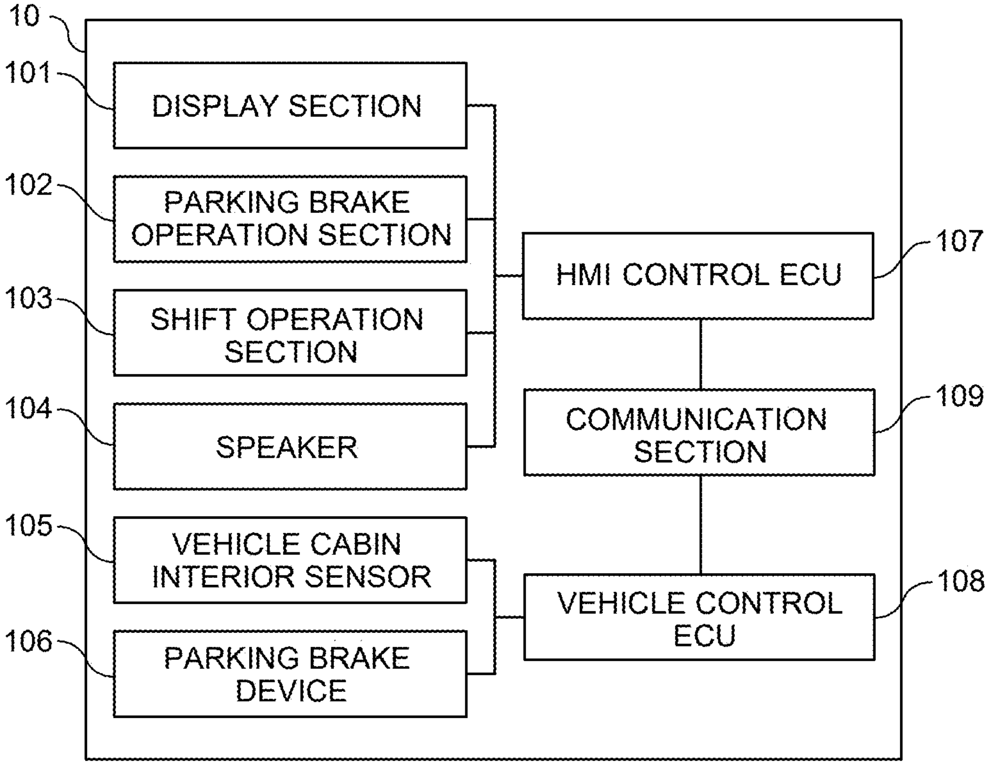
FIG. 1 is a diagram illustrating a schematic configuration of a vehicle according to an exemplary embodiment of the technology of the disclosure.

An example of an exemplary embodiment of the present disclosure will be explained below, with reference to the drawings. It should be noted that, in the respective drawings, identical or equivalent constituent elements and portions are appended with the same reference numerals. Further, dimensional proportions in the drawings are exaggerated for convenience of explanation and, in some cases, may be different from actual proportions.

FIG. 1 is a diagram illustrating a schematic configuration of a vehicle according to the present exemplary embodiment.

A vehicle 10 illustrated in FIG. 1 includes a display section 101, a parking brake operation section 102, a shift operation section 103, a speaker 104, a vehicle cabin interior sensor 105, a parking brake device 106, a human machine interface (HMI) control electronic control unit (ECU) 107, a vehicle control ECU 108, and a communication section 109.

The display section 101 is a display that is provided within a vehicle cabin of the vehicle and displays various types of information, such as, for example, a display that is provided at a driver's seat of the vehicle and displays a meter or the like, a display that displays driving guidance, video or the like, a head-up display that uses a windshield as a display, or the like.

The parking brake operation section 102 is a switch that is provided within the vehicle cabin of the vehicle and that is for actuating the parking brake device 106 in order for a driver to operate the parking brake device 106. Namely, the parking brake device 106 is an electric parking brake (EPB). The driver can actuate the parking brake device 106 by putting his/her hand on, and pulling, the parking brake operation section 102.

The shift operation section 103 is provided within the vehicle cabin of the vehicle, is configured to be operated by a driver in order to actuate a shift device (not illustrated in the drawings) of the vehicle, and is provided, for example, at a position in a vicinity of a navigation system or at a position in a vicinity of a center console.

The speaker 104 is provided within the vehicle cabin of the vehicle, and is configured so as to be capable of outputting information to an occupant by sound.

The vehicle cabin interior sensor 105 is a sensor for remotely detecting a state within the vehicle cabin of the vehicle, and particularly a state of the parking brake operation section 102 and a periphery of the parking brake operation section 102, and is, for example, a camera, an infrared sensor or the like. In a case in which a camera is used as the vehicle cabin interior sensor 105, the camera is installed, for example, at a periphery of a rear-view mirror in a state in which it is oriented in a direction in which an image of the driver's seat, the parking brake operation section 102, and the shift operation section 103 within the vehicle cabin can be captured.

The parking brake device 106 is a brake for maintaining a stopped state of the vehicle when the vehicle is parked.

The HMI control ECU 107 is provided at an interior of the vehicle, and is an ECU that carries out control relating to the display section 101, the parking brake operation section 102, the shift operation section 103, and the speaker 104. The HMI control ECU 107 is configured to include a central processing unit (CPU), a read only memory (ROM), a random access memory (RAM), an input/output I/F, and the like. The CPU is a central arithmetic processing unit, and the CPU executes various types of programs and controls various sections. Namely, the CPU reads out a program from the ROM, and executes the program using the RAM as a workspace. The ROM stores various types of programs and various types of data. The RAM serves as a workspace to temporarily store programs or data.

The HMI control ECU 107 is an example of the erroneous operation prevention device of the present disclosure. The HMI control ECU 107 executes control to prevent erroneous operation of the parking brake operation section 102. Specific control by the HMI control ECU 107 will be described later.

The vehicle control ECU 108 is provided at the interior of the vehicle, and is an ECU that carries out control relating to the vehicle cabin interior sensor 105 and the parking brake device 106. Similarly to the HMI control ECU 107, the vehicle control ECU 108 is configured to include a CPU, a ROM, a RAM, an input/output I/F, and the like. The CPU is a central arithmetic processing unit, and the CPU executes various types of programs and controls various sections. Namely, the CPU reads out a program from the ROM, and executes the program using the RAM as a workspace. The ROM stores various types of programs and various types of data. The RAM serves as a workspace to temporarily store programs or data.

The communication section 109 carries out communication between the HMI control ECU 107 and the vehicle control ECU 108. The communication between the HMI control ECU 107 and the vehicle control ECU 108 is, for example, carried out based on a communication standard according to the Controller Area Network (CAN) protocol.

Next, functional configurations of the HMI control ECU 107 will be explained.

Figure 2:
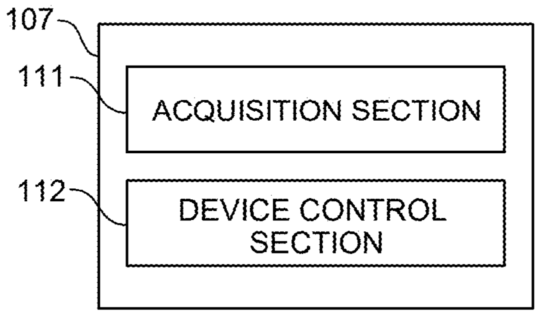
FIG. 2 is a block diagram illustrating an example of a functional configuration of an HMI control ECU.

FIG. 2 is a block diagram illustrating an example of the functional configurations of the HMI control ECU 107.

As illustrated in FIG. 2, the HMI control ECU 107 has, as functional configurations, an acquisition section 111 and a device control section 112. Each functional configuration is realized due to the CPU reading out and executing an erroneous operation prevention program that is stored in the ROM.

The acquisition section 111 acquires information relating to operation of the parking brake operation section 102 and the shift operation section 103. Specifically, the acquisition section 111 acquires signals that have been generated based on operation of the parking brake operation section 102 and the shift operation section 103.

The device control section 112 carries out control relating to the display section 101, the parking brake operation section 102, the shift operation section 103, and the speaker 104. In the present exemplary embodiment, the device control section 112 carries out control to prevent actuation of the parking brake device 106 in a case in which operation of the parking brake operation section 102 and operation of the shift operation section 103 have been carried out within a time period that is considered to be simultaneous. Within a time period that is considered to be simultaneous is not limited to being completely simultaneous, and also includes being within a predetermined time period, such as, for example, being within from 1 to 2 seconds.

The device control section 112 may determine whether or not operation of the parking brake operation section 102 has been carried out according to a signal from the parking brake operation section 102, or may determine this according to a result of sensing by the vehicle cabin interior sensor 105. The result of sensing by the vehicle cabin interior sensor 105 is sent from the vehicle control ECU 108 to the HMI control ECU 107.

In a case in which operation of the parking brake operation section 102 and operation of the shift operation section 103 have been carried out within a time period that is considered to be simultaneous, if operation of the parking brake operation section 102 and operation of the shift operation section 103 have further continued for a predetermined time period (for example, 10 seconds), the device control section 112 causes a warning message to be displayed at the display section 101, or causes a warning sound to be output from the speaker 104.

Due to having such a configuration, the HMI control ECU 107 can prevent actuation of the parking brake device 106 in a case in which operation of the parking brake operation section 102 and operation of the shift operation section 103 have been carried out within a time period that is considered to be simultaneous, during traveling of the vehicle.

Next, operation of the vehicle including the HMI control ECU 107 will be explained.

Figure 3:
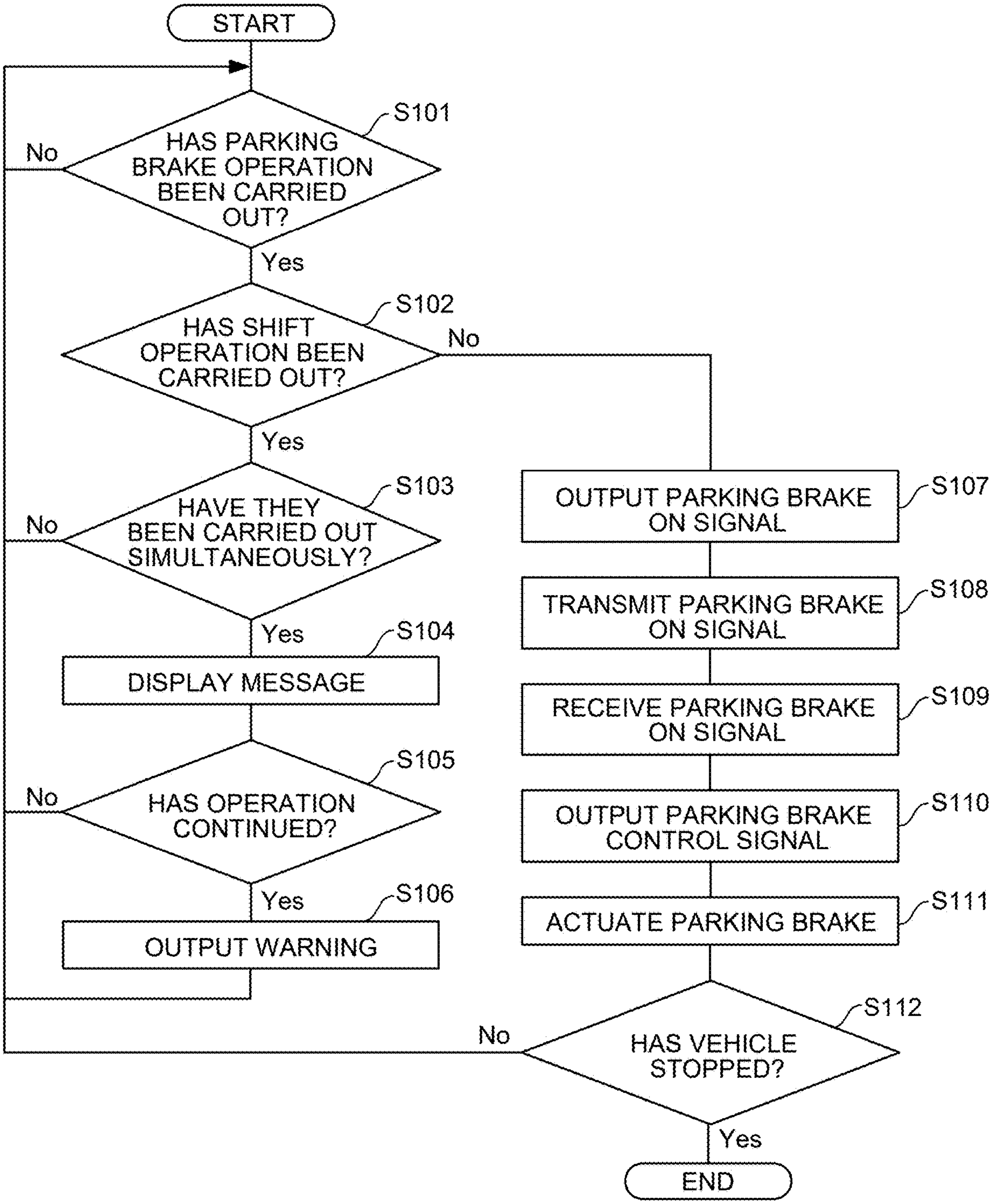
FIG. 3 is a flowchart illustrating a flow of operation of a vehicle including an HMI control ECU.

FIG. 3 is a flowchart illustrating a flow of operation of the vehicle including the HMI control ECU 107. The flowchart illustrated in FIG. 3 is executed when operation of the parking brake operation section 102 has been carried out by an occupant of the vehicle during traveling of the vehicle.

At step S101, the HMI control ECU 107 determines whether or not operation of the parking brake operation section 102 has been carried out.

If operation of the parking brake operation section 102 has not been carried out (step S101: No), the HMI control ECU 107 stands by until operation of the parking brake operation section 102 is carried out.

If operation of the parking brake operation section 102 has been carried out (step S101: Yes), following step S101, the HMI control ECU 107 determines, at step S102, whether or not operation of the shift operation section 103 has been carried out.

If operation of the shift operation section 103 has been carried out (step S102: Yes), following step S102, the HMI control ECU 107 determines, at step S103, whether or not operation of the parking brake operation section 102 and operation of the shift operation section 103 have been carried out within a time period that is considered to be simultaneous.

If operation of the parking brake operation section 102 and operation of the shift operation section 103 have not been carried out within a time period that is considered to be simultaneous (step S103: No), the HMI control ECU 107 returns to step S101, and determines whether or not operation of the parking brake operation section 102 has been carried out.

On the other hand, if operation of the parking brake operation section 102 and operation of the shift operation section 103 have been carried out within a time period that is considered to be simultaneous (step S103: Yes), the HMI control ECU 107 causes a message indicating that a foreign object is caught at the parking brake operation section 102 to be displayed at the display section 101 at step S104. For example, the HMI control ECU 107 causes a message stating "Shift and EPB cannot be operated simultaneously" to be displayed at the display section 101.

Following step S104, at step S105, the HMI control ECU 107 determines whether or not operation of the shift operation section 103 has continued for a predetermined time period (for example, 10 seconds).

If operation of the shift operation section 103 has continued for the predetermined time period (step S105: Yes), at step S106, the HMI control ECU 107 outputs a warning indicating that operation of the parking brake operation section 102 and operation of the shift operation section 103 have continued. For example, the HMI control ECU 107 outputs the warning by causing a warning message to be displayed at the display section 101, or by causing a warning sound to be output from the speaker 104.

On the other hand, if operation of the shift operation section 103 has not continued for the predetermined time period (step S105: No), the HMI control ECU 107 returns to step S101, and determines whether or not operation of the parking brake operation section 102 has been carried out.

If operation of the shift operation section 103 has not been carried out at aforementioned step S102 (step S102: No), following step S102, the HMI control ECU 107 outputs an ON signal for the parking brake device 106 at step S107.

Following step S107, at step S108, the communication section 109 transmits the ON signal for the parking brake device 106 to the vehicle control ECU 108. Following step S108, at step S109, the vehicle control ECU 108 receives the ON signal for the parking brake device 106 from the communication section 109. Following step S109, at step S110, the vehicle control ECU 108 outputs a parking brake control signal to the parking brake device 106. Following step S110, at step S111, the parking brake device 106 actuates the brake based on reception of the parking brake control signal.

Following step S111, at step S112, the HMI control ECU 107 determines whether or not the vehicle has stopped. The HMI control ECU 107 determines whether or not the vehicle has stopped, by obtaining information regarding a speed of the vehicle from the vehicle control ECU 108. If the vehicle has not stopped (step S112: No), the processing returns to step S101, and returns to determination of the presence or absence of operation of the parking brake operation section 102, by the HMI control ECU 107. On the other hand, if the vehicle has stopped (step S112: Yes), the vehicle ends the series of processing.

Figure 4:
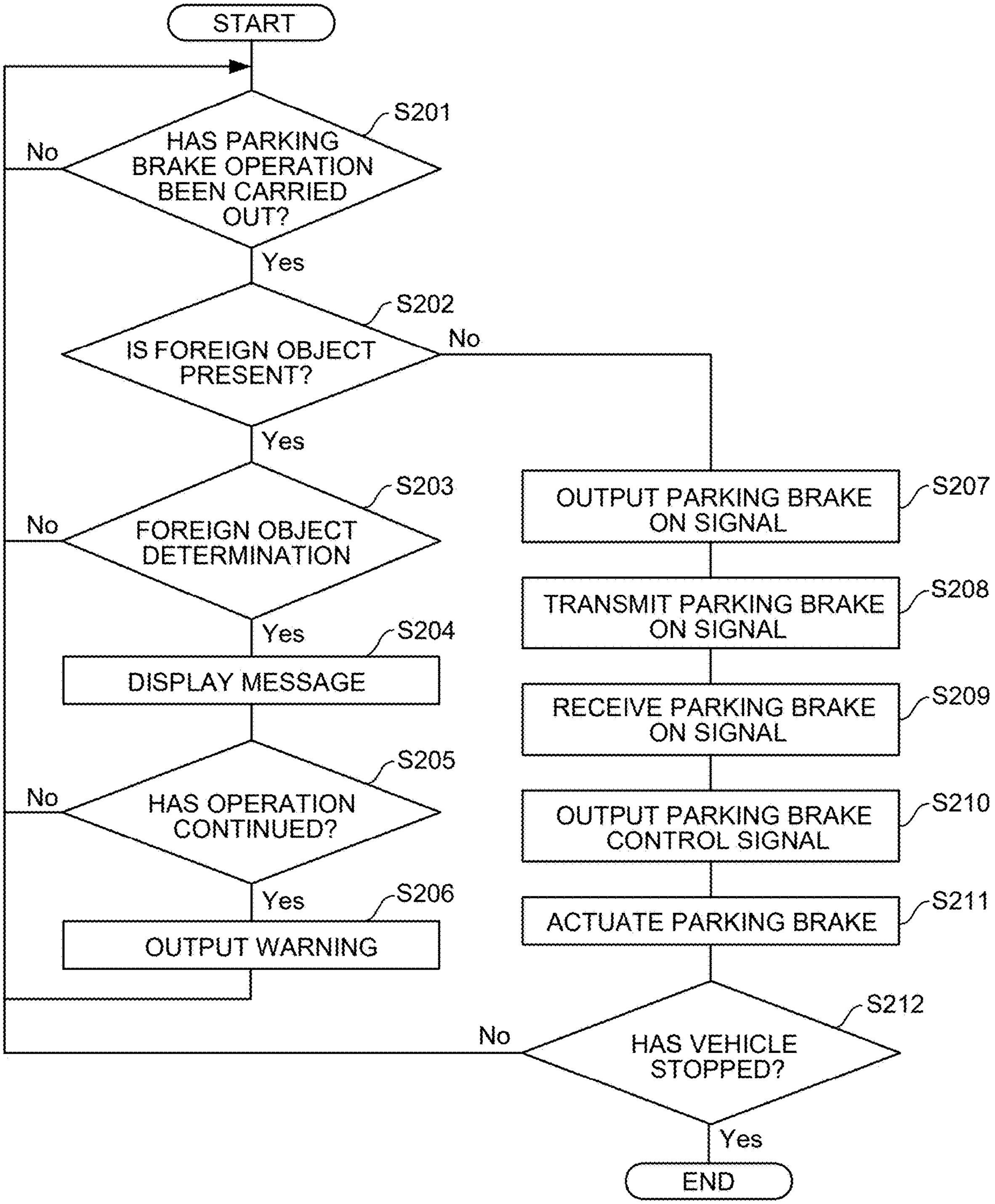
FIG. 4 is a flowchart illustrating a flow of operation of a vehicle including an HMI control ECU.

FIG. 4 is a flowchart illustrating a flow of operation of the vehicle including the HMI control ECU 107. The flowchart illustrated in FIG. 4 is executed when operation of the parking brake operation section 102 has been carried out by an occupant of the vehicle during traveling of the vehicle.

At step S201, the HMI control ECU 107 determines whether or not operation of the parking brake operation section 102 has been carried out.

If operation of the parking brake operation section 102 has not been carried out (step S201: No), the HMI control ECU 107 stands by until operation of the parking brake operation section 102 is carried out.

If operation of the parking brake operation section 102 has been carried out (step S201: Yes), following step S201, at step S202, the HMI control ECU 107 determines whether or not the vehicle cabin interior sensor 105 has detected the presence of a foreign object at a periphery of the parking brake operation section 102.

If a foreign object is present at the periphery of the parking brake operation section 102 (step S202: Yes), following step S202, at step S203, the HMI control ECU 107 determines whether or not the operation of the parking brake operation section 102 was carried out by the foreign object.

If the operation of the parking brake operation section 102 was not carried out by the foreign object detected by the vehicle cabin interior sensor 105 (step S203: No), the HMI control ECU 107 returns to step S201, and determines whether or not operation of the parking brake operation section 102 has been carried out.

On the other hand, if the operation of the parking brake operation section 102 was carried out by the foreign object detected by the vehicle cabin interior sensor 105 (step S203: Yes), at step S204, the HMI control ECU 107 causes a message indicating that a foreign object is caught at the parking brake operation section 102 to be displayed at the display section 101. For example, the HMI control ECU 107 causes a message stating "Shift and EPB cannot be operated simultaneously" to be displayed at the display section 101.

Following step S204, at step S205, the HMI control ECU 107 determines whether or not operation of the shift operation section 103 has continued for a predetermined time period (for example).

If operation of the shift operation section 103 has continued for the predetermined time period (step S205: Yes), at step S206, the HMI control ECU 107 outputs a warning indicating that operation of the parking brake operation section 102 and operation of the shift operation section 103 have continued. The HMI control ECU 107 outputs the warning, for example, by causing a warning message to be displayed at the display section 101, or by causing a warning sound to be output from the speaker 104.

On the other hand, if operation of the shift operation section 103 has not continued for the predetermined time period (step S205: No), the HMI control ECU 107 returns to step S201, and determines whether or not operation of the parking brake operation section 102 has been carried out.

If a foreign object is not present at the periphery of the parking brake operation section 102 at aforementioned step S202 (step S202: No), following step S202, at step S207, the HMI control ECU 107 outputs an ON signal for the parking brake device 106.

Following step S207, at step S208, the communication section 109 transmits the ON signal for the parking brake device 106 to the vehicle control ECU 108. Following step S208, at step S209, the vehicle control ECU 108 receives the ON signal for the parking brake device 106 from the communication section 109. Following step S209, at step S210, the vehicle control ECU 108 outputs a parking brake control signal to the parking brake device 106. Following step S210, at step S211, the parking brake device 106 actuates the brake based on reception of the parking brake control signal.

Following step S211, at step S212, the HMI control ECU 107 determines whether or not the vehicle has stopped. The HMI control ECU 107 determines whether or not the vehicle has stopped, by obtaining information regarding the speed of the vehicle from the vehicle control ECU 108. If the vehicle has not stopped (step S212: No), the processing returns to step S201, and returns to determination of the presence or absence of operation of the parking brake operation section 102, by the HMI control ECU 107. On the other hand, if the vehicle has stopped (step S212: Yes), the vehicle ends the series of processing.

Exemplary embodiments of the present disclosure have been explained in detail above with reference to the appended drawings, but the technical scope of the present disclosure is not limited to such examples. The embodiments that have been described above are exemplary in nature, and are not intended to limit the technical scope of the present disclosure. It will be obvious that various modified examples or revised examples can be conceived of by a person having ordinary skill in the technical field of the present disclosure within the scope of the technical ideas that are recited in the patent claims, and it will be understood that these modified examples or revised examples also naturally belong to the technical scope of the present disclosure.

Further, the advantageous effects that have been described in the above exemplary embodiments are illustrative or exemplary, and advantageous effects are not limited to those that have been described in the above exemplary embodiments. That is to say, the technology according to the present disclosure may exert other advantageous effects that will be apparent to a person having ordinary skill in the technical field of the present disclosure from the description in the above exemplary embodiments, in addition to the advantageous effects that have been described in the above exemplary embodiments or in place of the advantageous effects that have been described in the above exemplary embodiments.

It should be noted that the erroneous operation prevention processing that is executed by a CPU reading and executing software (a program) in the above exemplary embodiments may be executed by various types of processors other than a CPU. Examples of such processors include programmable logic devices (PLD) that allow circuit configuration to be modified after manufacturing, such as a field-programmable gate array (FPGA) or the like, and dedicated electrical circuits, which are processors including a circuit configuration that has been custom-designed to execute specific processing, such as an application specific integrated circuit (ASIC) or the like. Further, the erroneous operation prevention processing may be executed by any one of these various types of processors, or may be executed by a combination of two or more of the same type or different types of processors (such as, for example, plural FPGAs, a combination of a CPU and an FPGA, or the like). Furthermore, the hardware structure of these various types of processors is, more specifically, an electrical circuit combining circuit elements such as semiconductor elements or the like.

Further, although explanation has been given regarding an aspect in which a program for erroneous operation prevention processing is stored (installed) in advance in a ROM in the above exemplary embodiments, there is no limitation thereto. The program may be provided in a format that is recorded on a non-transitory recording medium, such as a compact disk read only memory (CD-ROM), a digital versatile disk read only memory (DVD-ROM), a universal serial bus (USB) memory or the like. Alternatively, the program may be provided in a format that is downloaded from an external device via a network.

What is claimed is:

1. An erroneous operation prevention device comprising:
- a memory; and
- a processor coupled to the memory,
- the processor being configured to perform processing including:
  - acquiring information regarding operation of a shift operation section that is operated in order to actuate a shift device of a vehicle, and operation of a parking brake operation section that is operated in order to actuate a parking brake device of the vehicle,
  - preventing actuation of the parking brake device in a case in which operation of the shift operation section and operation of the parking brake operation section have been carried out within a time period that is considered to be simultaneous, and
  - causing a predetermined message to be displayed at a display section of the vehicle in a case in which operation of the shift operation section and operation of the parking brake operation section have been carried out within a time period that is considered to be simultaneous.

2. The erroneous operation prevention device according to claim 1, wherein the processor determines whether or not operation of the shift operation section and operation of the parking brake operation section have been carried out within a time period that is considered to be simultaneous, using a signal generated based on operation of the shift operation section and the parking brake operation section.

3. The erroneous operation prevention device according to claim 1, wherein the processor determines whether or not operation of the shift operation section and operation of the parking brake operation section have been carried out within a time period that is considered to be simultaneous, using a result of detection by a sensor that is provided at an interior of the vehicle and that remotely detects operation of the shift operation section and the parking brake operation section.

4. The erroneous operation prevention device according to claim 3, wherein the sensor is a camera or an infrared sensor.

* * * * *